(12) United States Patent
Nandakumar et al.

(10) Patent No.: US 9,552,042 B2
(45) Date of Patent: Jan. 24, 2017

(54) ELECTRONIC DEVICE AND METHOD OF DETECTING TOUCHES ON A TOUCH-SENSITIVE DISPLAY

(71) Applicant: BLACKBERRY LIMITED, Waterloo (CA)

(72) Inventors: Rohan Michael Nandakumar, Kitchener (CA); Premal Vinodchandra Parekh, Waterloo (CA); Amit Pal Singh, Waterloo (CA)

(73) Assignee: BlackBerry Limited, Waterloo (CA)

( * ) Notice: Subject to any disclaimer, the term of this patent is extended or adjusted under 35 U.S.C. 154(b) by 217 days.

(21) Appl. No.: 13/958,361

(22) Filed: Aug. 2, 2013

(65) Prior Publication Data

US 2015/0035758 A1  Feb. 5, 2015

(51) Int. Cl.
  G06F 1/32 (2006.01)
  G06F 3/041 (2006.01)
  G06F 3/044 (2006.01)

(52) U.S. Cl.
  CPC .......... G06F 1/3212 (2013.01); G06F 1/3262 (2013.01); G06F 3/044 (2013.01); G06F 3/0416 (2013.01); *Y02B 60/1292* (2013.01)

(58) Field of Classification Search
  None
  See application file for complete search history.

(56) References Cited

U.S. PATENT DOCUMENTS 5,944,828 A    8/1999  Matsuoka
6,189,106 B1   2/2001  Anderson
2004/0193929 A1*  9/2004  Kuranuki ............... G06F 1/206
                                                    713/322
2008/0111698 A1   5/2008  Atherton
2009/0251436 A1* 10/2009  Keskin ........................ 345/174
2011/0145762 A1*  6/2011  Chun ........................... 715/810
2012/0249449 A1* 10/2012  Tseng et al. ................ 345/173
2013/0122804 A1   5/2013  Narendra
2013/0127757 A1*  5/2013  Mann ..................... G06F 3/041
                                                    345/173
2013/0194200 A1*  8/2013  Zanone et al. .............. 345/173
2014/0160085 A1*  6/2014  Rabii ..................... G06F 1/3262
                                                    345/178

FOREIGN PATENT DOCUMENTS

EP    0656578 A2    6/1995
EP    2602687 A1    6/2013

OTHER PUBLICATIONS

EPO Communication extended European Search Report dated Jul. 7, 2014, issued in respect of corresponding European Patent Application No. 13179189.9.

Partial European Search Report dated Mar. 28, 2014, issued in respect of corresponding European Patent Application No. 13179189.9.

\* cited by examiner

*Primary Examiner* — Amr Awad
*Assistant Examiner* — Donna Lui
(74) *Attorney, Agent, or Firm* — Borden Ladner Gervais LLP; Geoffrey deKleine

(57) ABSTRACT

A method includes determining a first output voltage of a battery of an electronic device. Based on the first output voltage, a first configuration file is identified. Touches on the touch-sensitive display are detected utilizing at least one parameter from the first configuration file.

7 Claims, 2 Drawing Sheets

ELECTRONIC DEVICE AND METHOD OF DETECTING TOUCHES ON A TOUCH-SENSITIVE DISPLAY

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
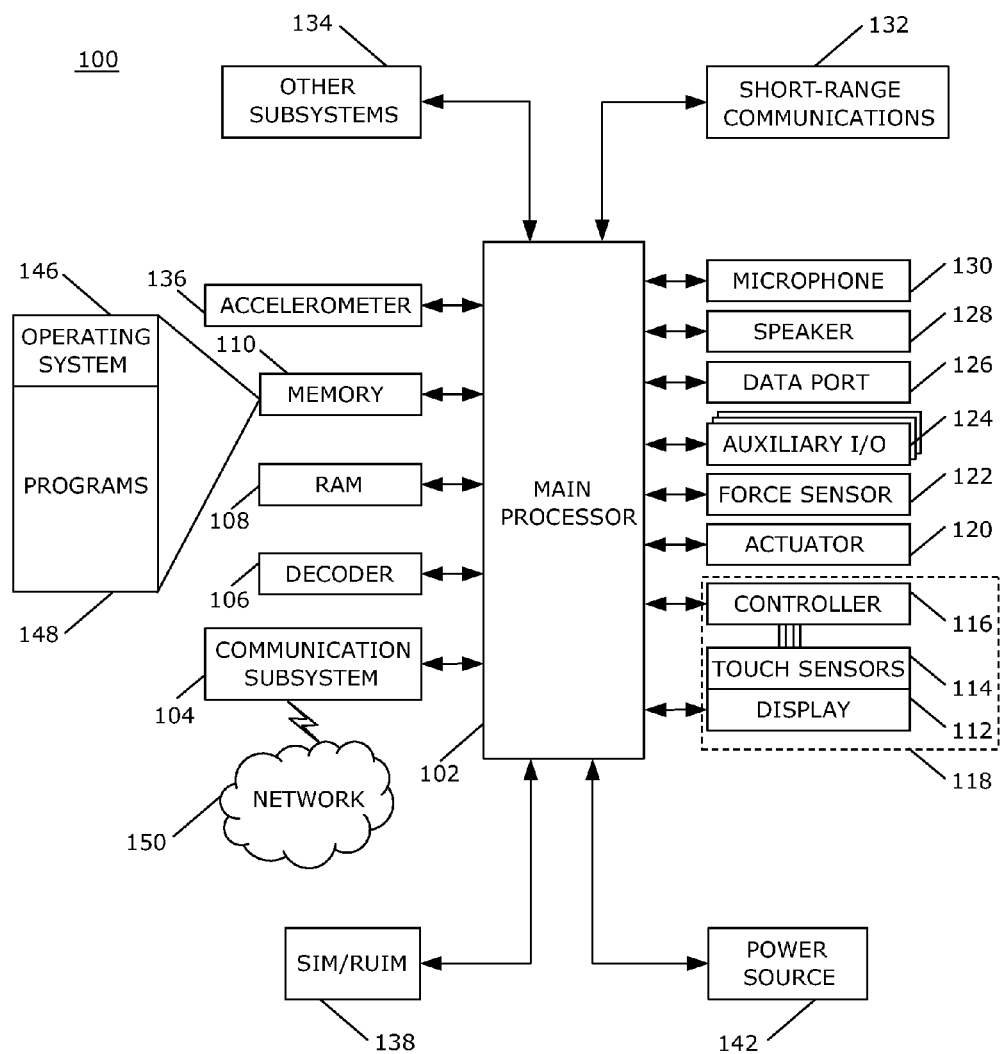
FIG. 1 is a block diagram of a portable electronic device in accordance with the disclosure.

The following describes an apparatus and method of detecting a touch on a touch-sensitive display. The processor and/or other apparatus of the electronic device determines an output voltage of the battery of the electronic device. Based on the output voltage, a configuration file is identified and utilized to detect touches on the touch-sensitive display. When a first output voltage value is determined, touches are detected utilizing at least one parameter from a first configuration file. When a second output voltage value is determined, touches are detected utilizing at least one parameter from a second configuration file.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smartphones, wireless organizers, personal digital assistants, wirelessly enabled notebook computers, tablet computers, mobile internet devices, electronic navigation devices, and so forth. The portable electronic device may be a portable electronic device without Wi-Fi communication capabilities, such as handheld electronic games, digital photograph albums, digital cameras, media players, e-book readers, and so forth. Examples of non-portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100 includes multiple components, such as a processor 102, e.g., a microprocessor or discrete control circuitry that controls the overall operation of the electronic device 100, which processor 102 is a hardware device or apparatus that may include memory. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Short-range communications include, for example, Bluetooth communications, near-field communications (NFC), and other short or limited range communications. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be a capacitive touch-sensitive display that includes capacitive touch sensors 114. The capacitive touch sensors 114 may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
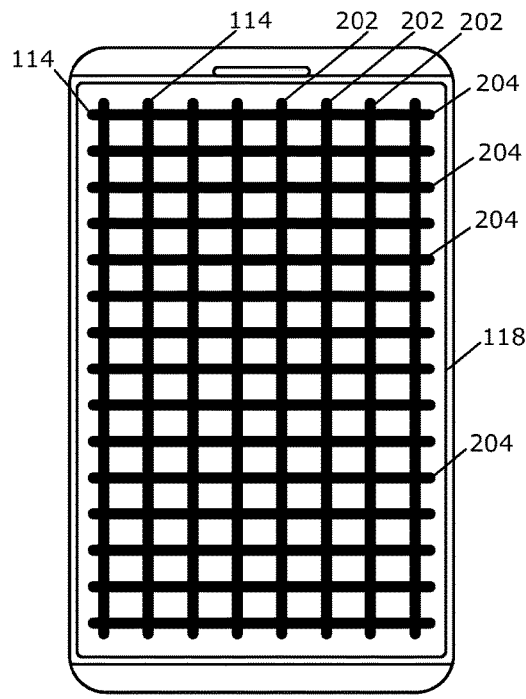
FIG. 2 is a front view of an electronic device in accordance with the disclosure.

A front view of an electronic device 100 is shown in FIG. 2. The touch-sensitive display 118 includes touch sensors 114, also referred to as touch-sensing electrodes. The touch-sensors 114 are operably coupled to the controller 116.

The touch sensors 114 of the touch-sensitive display 118 include drive electrodes 202 and sense electrodes 204 that may be disposed on two layers of the touch-sensitive display 118 such that the drive electrodes 202 are disposed on one layer and the sense electrodes 204 are disposed on another layer. Alternatively, the drive electrodes 202 and the sense electrodes 204 may be disposed generally on one layer or plane of the touch-sensitive display 118. The drive electrodes 202 and the sense electrodes 204 are not visible when viewing the electronic device 100 without utilizing an optical instrument such as a microscope, loupe, magnifying glass, or other magnifying device, but are shown as visible in FIG. 2 for the purpose of illustration. In the example of FIG. 2, the drive electrodes 202 are the longer or vertical electrodes, and the sense electrodes 204 are the shorter or horizontal electrodes. Alternatively, the drive electrodes may be the shorter or horizontal electrodes, and the sense electrodes may be the longer or vertical electrodes. The sense electrodes 204 are utilized to detect changes in the signal at the nodes 206, which are the locations where the sense electrodes 204 cross over the drive electrodes 202.

Each drive electrode 202 and each sense electrode 204 is coupled to the controller 116. During operation of the portable electronic device 100, the touch-sensitive display 118 is scanned to detect touches. During a touch-detecting scan of the touch-sensitive display 118, the drive electrodes are driven. A drive electrode 202 is driven by applying pulses of a periodic wave to the drive electrode. While the drive electrode 202 is driven, signals are received from the sense electrodes 204. The signals received from the sense electrodes are compared to a threshold to identify a touch.

To detect touches with a high signal-to-noise ratio, driving electrodes of the touch-sensitive display utilizing signals that have a relatively high voltage value, for example, 3.6 V is desirable. Such a drive voltage value is not sustainable as the battery discharges during use of the portable electronic device 100. Thus, a lower drive voltage value, for example 2.85 V, is typically utilized to detect touches. The lower voltage value is utilized because the value is sustainable for a longer period of time while the battery discharges during use of the portable electronic device 100. The lower voltage value, however, results in lower signal-to-noise ratio.

A configuration file is utilized by the controller 116 to collect touch data utilized to detect touches on the touch-sensitive display 118. The configuration file may include one or more parameters, such as an identification of the voltage value at which the drive electrodes are driven, the number of pulses of signal applied to drive each drive electrode 202, a touch threshold that is compared to signals received from the sense electrodes 204 to identify a touch, an identification of frequencies at which the drive electrodes are driven, an identification of one or more time periods during which sensing is carried out while driving the drive electrodes, and so forth.

The portable electronic device 100 includes a plurality of configuration files or parts of configuration files that are stored by the processor 102 and are utilized by the controller 102. The processor 102 controls which configuration file is utilized by the controller 116 to detect touches. The processor 102 identifies a configuration file or part of a configuration file for the controller 116 and loads a selected or identified configuration file or part of a configuration into the controller 116.

Figure 3:
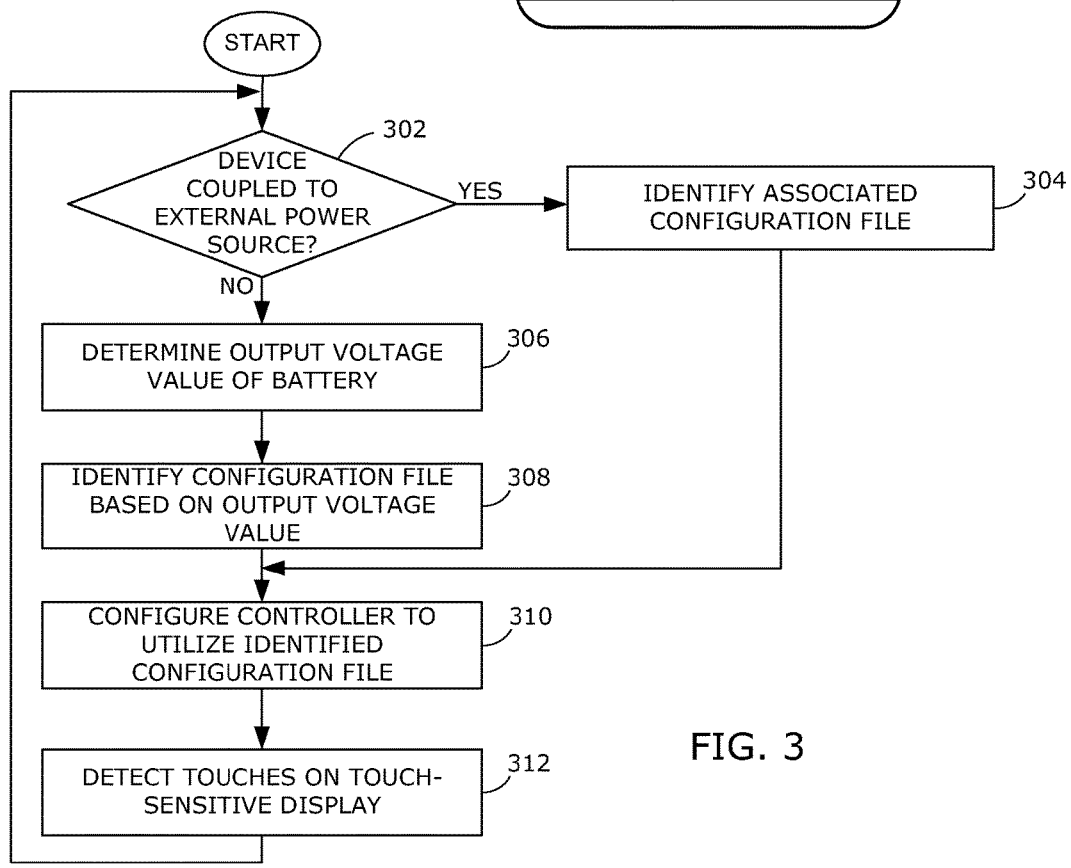
FIG. 3 is a flowchart illustrating a method of detecting touches on a touch-sensitive display.

A flowchart illustrating an example of a method of detecting touches on a touch-sensitive display 118 is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the electronic device 100 to perform the method may be stored in a computer-readable storage medium, device, or apparatus, which may be a non-transitory or tangible storage medium, device, or apparatus.

When the portable electronic device 100 is coupled to an external power source, such as an Alternating Current (AC) charger or automobile power plug for charging the battery of the portable electronic device 100, the coupling to the external power source is optionally detected 302 by the portable electronic device 100, and an associated configuration file is identified 304 by the processor 102. The configuration file may be, for example, the configuration file associated with the highest voltage. The configuration file may also identify a drive signal comprising a number or quantity of pulses to be applied to each drive electrode, and a threshold capacitance value that is compared to signals received from the sense electrodes during touch. The coupling to the external power source may be detected when a power source is connected to a port of the electronic device 100, for example, when a Universal Serial Bus (USB) handshake occurs between the portable electronic device and the external power source. Alternatively, a characteristic or voltage value may be detected or determined, which suggests that the external power source is coupled. Other methods of detecting the external power source may be utilized.

When the portable electronic device 100 is not coupled to an external power source, an output voltage value of the battery is determined 306. The output voltage value of the battery is determined, for example, by a gauge that monitors battery state or conditions, such as output voltage, output current, and temperature. The output voltage value of the battery may be, for example, the value of the voltage that the battery is capable of outputting at the time that the output voltage value is determined. The output voltage value changes based on the charge of the battery. As the battery discharges, e.g., during operation of the portable electronic device 100, the output voltage value decreases. The output voltage value may be determined based on a steady-state or stable value for a predetermined period of time, such as 1 minute, rather than an instantaneous value.

Based on the output voltage value of the battery, the associated configuration file is identified 308. The associated configuration file may be identified by, for example, a look up table that associates output voltage values of the battery with configuration files. A plurality of configuration files may be associated with different output voltage values. Each configuration file may be different from the other configuration files. A different configuration file identifies at least one parameter that is different from another configuration file.

For example, four configuration files may be associated with different output voltage values such that each configuration file is associated with a range of output voltage of the battery. Any number of configuration files and associated ranges of output voltage of the battery may be stored in the portable electronic device 100. For example, larger voltage sources may utilize more configuration files than smaller voltage sources.

The controller 116 is configured 310 to utilize the identified configuration file by loading the identified configuration file to the controller 116. The configuration file may be loaded by writing values of the parameters of the configuration file to locations, referred to as register locations, also known as addresses, into the touch controller. The configuration file includes the values that are written to the register locations. Thus, the processor is configured to change the configuration file in the controller. When the configuration file remains the same, e.g., the identified configuration file is the same configuration file in the controller, the configuration file is not loaded again by the processor 102. When the identified configuration file is different from the configuration file utilized by the controller, the identified configuration file is loaded in the controller 116. For example, the configuration file may be loaded in the controller when a touch is not detected for a period of time, when the portable electronic device is in a low power or sleep mode, or when the portable electronic device 100 is locked, and so forth. The controller utilizes the parameters of the identified configuration file to detect 312 touches.

Examples of parameters identified in four configuration files are shown in Table 1. Each configuration file is associated with a range of output voltage values of the battery and identifies parameters that are utilized to detect touches.

TABLE 1

| BATTERY OUTPUT VOLTAGE VALUE | CONFIGURATION FILE | VOLTAGE | PULSES | THRESHOLD |
|---|---|---|---|---|
| >3.6 V | 1 | 3.6 | 5 | 55 |
| >3.4 V-3.6 V | 2 | 3.3 | 6 | 55 |
| >3.1 V-3.4 V | 3 | 3.0 | 7 | 55 |
| <3.1 V | 4 | 2.85 | 8 | 55 |

An output voltage value that is greater than 3.6 V is associated with a first configuration file in the example of Table 1. An output voltage value from greater than 3.4 V to 3.6 V is associated with a second configuration file, an output voltage value from greater than 3.1 V to 3.4 V is associated with a third configuration file, and an output voltage value of 3.1 V or less is associated with a fourth configuration file in the example of Table 1.

The first configuration file differs from the second, the third, and the fourth configuration files in this example, because at least one parameter is different between the first configuration file and each of the second configuration file, the third configuration, and the fourth configuration file. Although each configuration file differs from each of the other configuration files by at least one parameter in the example of FIG. 1, similar configuration files may be utilized.

The parameters from the first configuration file include an identification of a voltage value of 3.6 V at which the drive electrodes 202 are driven, a drive signal comprising 5 pulses applied to each drive electrode 202, and a threshold capacitance value that is compared to signals received from the sense electrodes 204 during touch detection. The threshold value may be, for example 55 femtofarads. Other threshold values, such as 50 fF, 60 fF, and so forth, may also be utilized.

The parameters from the second configuration file include an identification of a voltage value of 3.3 V at which the drive electrodes 202 are driven, and a drive signal comprising 6 pulses applied to each drive electrode 202. The threshold value at which a touch is detected may be maintained because, compared to the first configuration file, the number of pulses is increased with the decrease in voltage. The frequency of the pulses in different configuration files may be the same. Optionally, the frequency of the pulses in different configuration files may be different.

The parameters from the third configuration file include an identification of a voltage value of 3.0 V at which the drive electrodes 202 are driven and a drive signal comprising 7 pulses applied to each drive electrode 202. The threshold value at which a touch is detected may be maintained because, compared to the first configuration file, the number of pulses is increased with the decrease in voltage.

The parameters from the third configuration file include an identification of a voltage value of 2.85 V at which the drive electrodes 202 are driven and a drive signal comprising 8 pulses applied to each drive electrode 202.

In this example, the first configuration file is identified when the output voltage value of the battery is greater than 3.6 V. The first configuration file may also be identified when the portable electronic device 100 is coupled to an external power source.

When the battery is fully charged and the output voltage value of the battery is highest, the first configuration file is identified and the parameters from the first configuration file are utilized to detect touches on the touch-sensitive display 118.

When the battery is not charged, the output voltage value decreases as operation of the portable electronic device 100 continues. As the output voltage value of the battery decreases to 3.4 V to 3.6 V in this example, the second configuration file is identified and the parameters from the second configuration file are utilized to detect touches. A second drive voltage at which drive electrodes are driven is identified and is utilized to detect touches on the touch-sensitive display 118.

As the output voltage value of the battery continues to decrease to 3.1 V to 3.4 V in this example, the third configuration file is identified and the parameters from the third configuration file are utilized to detect touches. A third drive voltage at which drive electrodes are driven is identified and is utilized to detect touches on the touch-sensitive display 118.

When the output voltage value decrease below 3.1 V in this example, the fourth configuration file is identified and the parameters from the fourth configuration file are utilized to detect touches. A fourth drive voltage at which drive electrodes are driven is identified and is utilized to detect touches on the touch-sensitive display 118.

Although the above example illustrates four profiles and specific voltages and parameters, any number of profiles, other voltages, frequency of pulses, and other parameters may be utilized.

The lower drive voltage at which drive electrodes are driven results in a lower signal-to-noise ratio of the signals from the sense electrodes. Other parameters identified in the configuration file, such as the number of pulses and threshold values, may be utilized to compensate for the lower signal-to-noise ratio. The threshold values may include, for example, a threshold that is compared to the signals received from the sense electrodes to identify a touch.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of controlling a portable electronic device including a processor coupled to a touch-sensing controller, the method comprising:
   determining, by the processor of the portable electronic device, a first output voltage value of a battery of the portable electronic device;
   in response to determining the first output voltage value of the battery, identifying, by the processor, a first configuration file based on the first output voltage value of the battery, the first configuration file including an identification of a first number of pulses to be applied to drive electrodes that are driven by the touch-sensing controller to detect touches, a first drive voltage to drive the drive electrodes, and a first threshold capacitance value that is utilized to compare to signals received from sense electrodes coupled to the touch-sensing controller to detect touches, and loading, by the processor, into the touch-sensing controller coupled to the processor of the portable electronic device, the first configuration file identified by the processor such that the touch-sensing controller utilizes parameters including the first number of pulses and the first threshold capacitance value from the first configuration file to detect touches on the touch-sensitive display;

determining, by the processor of the portable electronic device, a second output voltage value of a battery of the portable electronic device wherein the second output voltage is lower than the first output voltage;

in response to determining the second output voltage value of the battery, identifying, by the processor, a second configuration file based on the second output voltage value of the battery, the second configuration file including an identification of a second number of pulses to be applied to the drive electrodes that are driven by the touch-sensing controller to detect touches, a second drive voltage to drive the drive electrodes, and a second threshold capacitance value that is utilized to compare to signals received from sense electrodes coupled to the touch-sensing controller to detect touches, and loading, by the processor, into the touch-sensing controller coupled to the processor of the portable electronic device, the second configuration file identified by the processor such that the touch-sensing controller utilizes parameters including the second number of pulses and the second threshold capacitance value from the second configuration file to detect touches on the touch-sensitive display, wherein the second number of pulses includes more pulses than the first number of pulses and the second drive voltage is lower than the first drive voltage;

determining, by the processor of the portable electronic device, a third output voltage value of the battery of the portable electronic device, wherein the third output voltage is lower than the second output voltage;

in response to determining the third output voltage value of the battery, identifying, by the processor, a third configuration file based on the third output voltage value of the battery, the third configuration file including an identification of a third number of pulses to be applied to the drive electrodes that are driven by the touch-sensing controller to detect touches, a third drive voltage to drive the drive electrodes, and a third threshold capacitance value that is utilized to compare to signals received from sense electrodes coupled to the touch-sensing controller to detect touches, and loading, by the processor, into the touch-sensing controller coupled to the processor of the portable electronic device, the third configuration file identified by the processor such that the touch-sensing controller utilizes parameters including the third number of pulses and the third threshold capacitance value from the third configuration file to detect touches on the touch-sensitive display, wherein the third number of pulses includes more pulses than the second number of pulses and the third drive voltage is lower than the second drive voltage;

wherein the first configuration file differs from the second configuration file and the third configuration file, and wherein the second configuration file differs from the third configuration file.

2. The method according to claim 1, comprising, in response to determining that the portable electronic device is coupled to an external power source, identifying a fourth configuration file that includes an identification of a highest drive voltage, and detecting, utilizing the highest drive voltage, touches on the touch-sensitive display.

3. A non-transitory computer-readable storage device having computer-readable code executable by at least one processor of the portable electronic device to perform the method of claim 1.

4. A portable electronic device comprising:
a touch-sensitive display including a controller coupled to touch-sensing electrodes;
a battery configured to provide power to the touch-sensitive display;
a processor coupled to the battery and to the controller of the touch-sensitive display and configured to:
determine an output voltage of the battery;
based on a first output voltage value, identify a first configuration file including an identification of a first number of pulses to be applied to the drive electrodes that are driven by the touch-sensing controller to detect touches, a first drive voltage to drive the drive electrodes, and a first threshold capacitance value that is utilized to compare to signals received from sense electrodes coupled to the touch-sensing controller to detect touches, and load the first configuration file into the controller to drive the electrodes to detect touches on the touch-sensitive display utilizing parameters, including the first number of pulses and the first threshold capacitance value, of the first configuration file;
based on a second output voltage value, identify a second configuration file including an identification of a second number of pulses to be applied to the drive electrodes that are driven by the touch-sensing controller to detect touches, a second drive voltage to drive the drive electrodes, and a second threshold capacitance value that is utilized to compare to signals received from sense electrodes coupled to the touch-sensing controller to detect touches, and load the second configuration file into the controller to drive the electrodes to detect touches on the touch-sensitive display utilizing parameters, including the second number of pulses and the second threshold capacitance value, of the second configuration file, wherein the second output voltage is lower than the first output voltage, the second number of pulses includes more pulses than the first number of pulses and the second drive voltage is lower than the first drive voltage;
based on a third output voltage value, identify a third configuration file including an identification of a third number of pulses to be applied to the drive electrodes that are driven by the touch-sensing controller to detect touches, a third drive voltage to drive the drive electrodes, and a third threshold capacitance value that is utilized to compare to signals received from sense electrodes coupled to the touch-sensing controller to detect touches, and load the third configuration file into the controller to drive the electrodes to detect touches on the touch-sensitive display utilizing parameters, including the third number of pulses and the third threshold capacitance value, of the third configuration file, wherein the third output voltage is lower than the second output voltage, the third number of pulses includes more pulses than the second number of pulses and the third drive voltage is lower than the second drive voltage;

wherein the second configuration file is different from the first configuration file and from the third configuration file and the first configuration file is different from the third configuration file.

5. The portable electronic device according to claim 4, wherein, in response to determining that the portable electronic device is coupled to an external power source, the processor configures the controller to drive the electrodes at a highest drive voltage.

6. The portable electronic device according to claim 4, wherein when the first configuration file is applied to the controller, first signals are applied to drive the electrodes at the first drive voltage and, when the second configuration file is applied to the controller, second signals are applied to drive the electrodes at the second drive voltage, wherein the first and second signals are applied at a first frequency.

7. The portable electronic device according to claim 4, wherein the processor is configured to:

change from the first configuration file utilized by the controller to the second configuration file utilized by the controller when no touch is detected on the touch-sensitive display;

wherein the first configuration file includes an identification of a first drive voltage and the second configuration file includes an identification of a second drive voltage.

* * * * *